(12) United States Patent
Demirtshian et al.

(10) Patent No.: US 8,561,099 B2
(45) Date of Patent: Oct. 15, 2013

(54) SYSTEMS AND METHODS FOR USING INTERACTIVE CONTENT TO INCREASE VIEWERSHIP

(76) Inventors: Ralph Demirtshian, Newport Beach, CA (US); Reuben D. Nathan, Newport Beach, CA (US)

( * ) Notice: Subject to any disclaimer, the term of this patent is extended or adjusted under 35 U.S.C. 154(b) by 0 days.

(21) Appl. No.: 13/417,089

(22) Filed: Mar. 9, 2012

(65) Prior Publication Data
US 2013/0239140 A1  Sep. 12, 2013

(51) Int. Cl.
*H04N 7/16* (2011.01)

(52) U.S. Cl.
USPC .............................................................. 725/23

(58) Field of Classification Search
USPC .............................................................. 725/25
See application file for complete search history.

(56) References Cited

U.S. PATENT DOCUMENTS

| | | | |
|---|---|---|---|
| 5,759,101 A * | 6/1998 | Von Kohorn | 463/40 |
| 2001/0032125 A1* | 10/2001 | Bhan et al. | 434/332 |
| 2002/0046095 A1* | 4/2002 | Wallace | 705/14 |
| 2003/0040921 A1* | 2/2003 | Hughes et al. | 705/319 |
| 2004/0133468 A1* | 7/2004 | Varghese | 705/14 |
| 2004/0143840 A1* | 7/2004 | Fukuda et al. | 725/32 |
| 2004/0261125 A1* | 12/2004 | Ellis et al. | 725/133 |
| 2006/0253330 A1* | 11/2006 | Maggio et al. | 705/14 |
| 2008/0115181 A1* | 5/2008 | Ryckman et al. | 725/109 |
| 2009/0115843 A1* | 5/2009 | Sohmers | 348/61 |
| 2010/0138852 A1* | 6/2010 | Hirsch et al. | 705/14.14 |
| 2010/0242063 A1* | 9/2010 | Slaney et al. | 725/32 |
| 2011/0237318 A1* | 9/2011 | Sama | 463/9 |

* cited by examiner

*Primary Examiner* — Vivek Srivastava
*Assistant Examiner* — Junior Mendoza
(74) *Attorney, Agent, or Firm* — Carr & Ferrell LLP

(57) ABSTRACT

Various embodiments of the present disclosure are directed to methods and systems for increasing viewership of video content. Video content may be provided for viewing by a plurality of users. Interactive content may be associated with the video content and delivered for viewing by the plurality of users. The interactive content may request a response from the users, and one or more reward levels may be assigned to each responding user.

35 Claims, 6 Drawing Sheets

SYSTEMS AND METHODS FOR USING INTERACTIVE CONTENT TO INCREASE VIEWERSHIP

FIELD OF THE INVENTION

The present disclosure relates generally to advertising, and more specifically to using interactive content in conjunction with video content to increase viewership of advertisements.

SUMMARY

Various embodiments of the present disclosure are directed to methods and systems for increasing viewership of video content. Video content may be provided for viewing by a plurality of users. Interactive content may be associated with the video content and delivered for viewing by the plurality of users. The interactive content may request a response from the users, and one or more reward levels may be assigned to each responding user.

DETAILED DESCRIPTION

Various embodiments of the present disclosure are directed to methods and systems for increasing viewership of video content. Video content may be provided from a server-based system for viewing by a plurality of users. Interactive content may be associated with the video content and delivered for viewing by the plurality of users. The interactive content may request a response from the users. The responses may be received from at least a portion of the users, and one or more reward levels may be assigned to each responding user.

Figure 1:
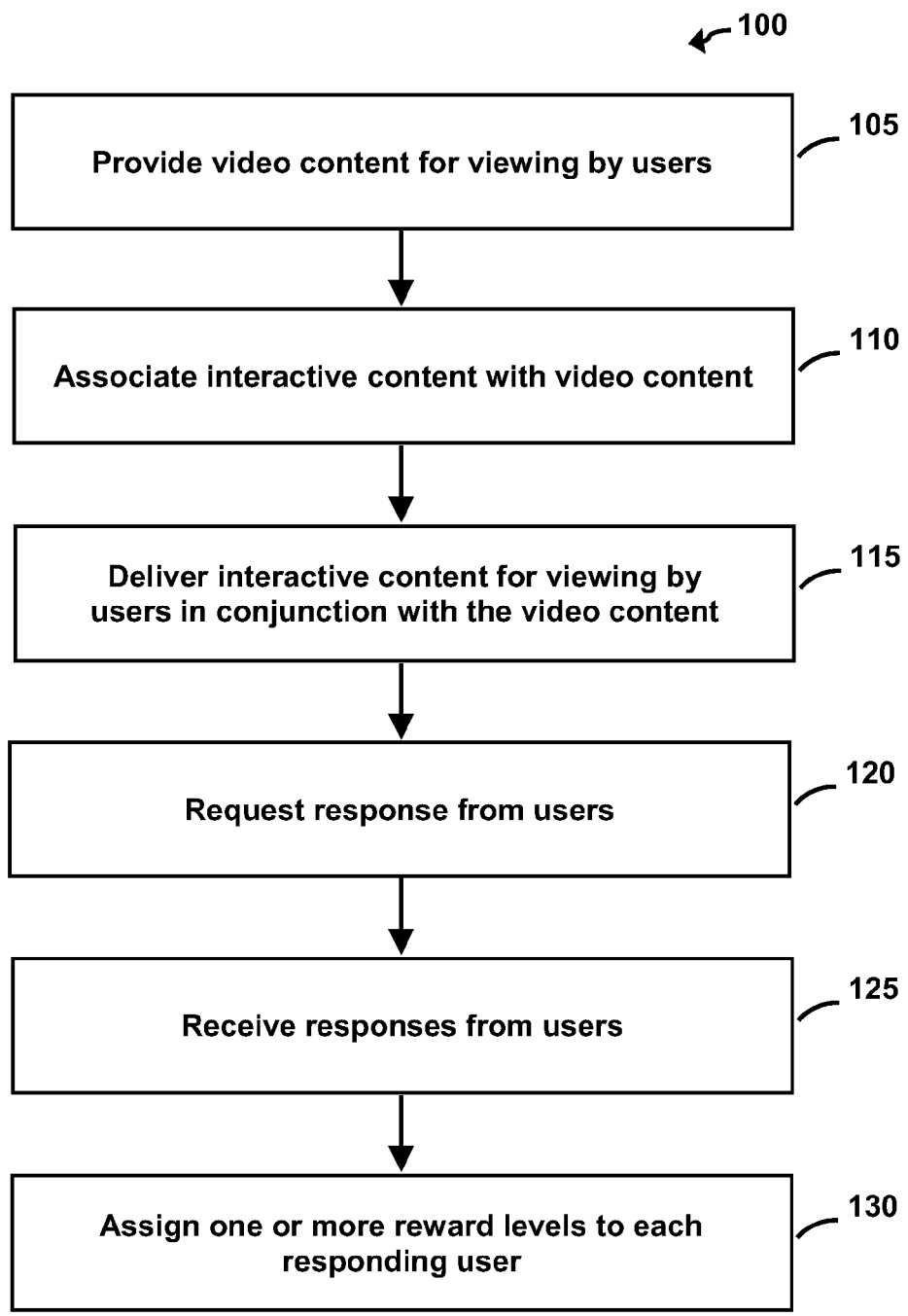
FIG. 1 is an exemplary flow diagram of a method for increasing viewership of video content according to various embodiments.

FIG. 1 is a flow chart of various embodiments of a method 100 for increasing viewership of video content. At step 105, video content may be provided for viewing by a plurality of users. The video content may be delivered to the users at least partially by a server-based system. In such a server-based system, the video content may be stored in a digital format by one or more storage devices operatively coupled to the server-based system. The server-based system, as further described below, may be comprised of a discrete computer system at a fixed location, or a cloud computing system.

The video content may be any form of video, whether a motion picture or still images, delivered to a user for viewing. The video content may comprise a television (TV) program intended for over-the-air broadcast, cable broadcast, or Internet-based delivery to a user, among other delivery methods known in the art. The video content may also comprise a sporting event, news program, educational program, political event, on-demand content, video game, or any other entertainment or informational content. The video content may comprise a single program or event, such as a specific football game, or may comprise a multi-part series, such as a season of episodes of a TV program. The video content may be in a high-definition or low-definition format, and may contain audio content in addition to the video content.

The video content may be delivered to the user by over-the-air broadcast using, for example, the National Television System Committee (NTSC) analog format, the Advanced Television Systems Committee (ATSC) digital format, or any other broadcast format known in the art. The video content may also be delivered over a cable TV system or a satellite broadcast system. In addition, video content may be delivered over the Internet, with or without a web browser program. Video content delivered over the Internet may be reproduced using a program for video reproduction, such as Windows Media Player® (registered mark of Microsoft Corporation), Adobe® Flash® Player (registered marks of Adobe Systems Incorporated), QuickTime® (registered mark of Apple Incorporated), and the like. Examples of video content delivered over the Internet may comprise YouTube® (registered mark of Google, Incorporated) videos, music videos, and replays of broadcast video content provided by broadcast companies such as CBS, NBC, ABC, Fox, and the like, and video content or still images displayed on social media websites such as Facebook® (registered mark of Facebook, Incorporated), LinkedIn@ (registered mark of LinkedIn Corporation), Myspace® (registered mark of Myspace, Incorporated), and the like. In various embodiments, the video content may be delivered over a cellular telephone network to the user's smartphone.

At step 110, interactive content may be associated with the video content. In the context of the present disclosure, the phrase "associated with" may refer to any method of linking specific interactive content with specific video content based on some commonality between the two. In various embodiments, the linking may be based on the subject matter of the video content. In certain embodiments where the video content is a sporting event, the interactive content associated with the sporting event may involve the same sporting event or a player participating in the sporting event. The interactive content may also relate to a product or service endorsed by the player. In certain other embodiments, the video content may be a movie. The interactive content associated with the movie may involve someone associated with the movie, such as an actor or actress, director, producer, or editor. The interactive content may also be linked to the movie by location in which the movie takes place. The examples provided above are intended to be exemplary only, and are not to be construed as limiting the scope of the present disclosure in any way.

In various embodiments, there may be little or no commonality between the interactive content and the video content. For example, the interactive content may be a game of skill or a game of chance. These games may not be linked by subject matter or other common feature with the video content any may be intended to appeal to a wider audience that may not necessarily have significant knowledge of the video content subject matter.

The interactive content may comprise any video and/or audio content that requests a response or feedback from the user. The interactive content may be in a video format similar to that described above for the video content, text that appears on a portion of a video display device, animation, a still image, a 2-D or 3-D barcode, or any other visual representation that may be displayable on a video display device. The interactive content may also comprise imbedded information, such as links to websites, meta-information, and machine executable instructions. Additionally, the interactive content may comprise only an audio component. The interactive content may also comprise any combination of the above video and/or audio content, or other content as known in the art.

The interactive content may then be delivered for viewing by the user in conjunction with the video content (step 115). In certain embodiments, the interactive content may be delivered on the same video display device used for viewing the video content. For example, the interactive content may comprise a pop-up box on a portion of the video display device that appears while the video content is being displayed. In various other embodiments, the interactive content may be delivered on a video display device other than the one used for viewing the video content. For example, the user may be viewing the video content on a TV, while the interactive content is delivered to the user's smartphone.

In the context of the present disclosure, the phrase "in conjunction with" may refer to being temporally related to when the user views the video content. Thus, the interactive content may be delivered to the user a short time prior to or following when the user views the video content. The interactive content may also be delivered while the user is viewing the video content. In various embodiments, the interactive content may be delivered to the user at multiple times, such as just before and just after viewing the video content. Additionally, the interactive content need not be delivered to all users at the same time. For example, interactive content delivered during a live broadcast of a sporting event may be delivered to a portion of the users in a certain geographic area. In another example, the video content may be pre-recorded and available for a period of time over the Internet. Users may log into a website to view the video content at various times during the period of time the video content is available. Thus, the interactive content may be delivered to each user at different times depending on when each user logged into the website.

The interactive content may then request a response from the user (step 120). The response provided by the user may be any indication of a reply initiated by the user in response to viewing and/or hearing the interactive content, and may be initiated across a variety of platforms. For example, the interactive content may ask the user to answer a question, and the response may be the answer provided by the user. In various embodiments, the user may indicate the answer by using a remote control to highlight one of several possible answers displayed on a TV. The user may select the answer by voice command where the display device is equipped to accept voice commands. The user may also use a computer to log into a predetermined website and provide the response through the website, including a social media website. Additionally, the user may provide the response using an application installed on a smartphone, or my sending a text message or an instant message. In other embodiments, the user may call a designated telephone number to provide the response.

The response from one or more of the users may then be received (step 125). The responses may be routed to the server-based system or any other system capable of receiving the responses and performing an analysis of the responses. This analysis may comprise determining whether the response is the correct answer, when the response was received in relation to when the request was made or in relation to other responses from other users, a numerical tally of when the response was received among all the responses received, and the like.

In various embodiments, the analysis performed on the responses may be used to rank the responses in order to assign one or more reward levels to each responding user (step 130). Any scheme may be used to assign reward levels to the responding users. For example, many users may submit the correct answer to a question, but the analysis may determine who submitted a first correct response, a second correct response, a third correct response, and so on. A first reward level may be assigned to the user with the first correct response, a second reward level to the user with the second correct response, a third reward level to the users with the third through tenth correct response, and so on.

In various embodiments, only the first user to submit a correct response may be assigned a reward level, while all other users who submit a correct response receive no reward. In other embodiments, all the other users who submit a correct response may receive the same reward. For example, the user who submits the first correct response may receive a free product or service, and all other users who submit a correct response receive a 10 percent discount off the purchase of the product or service. In still other embodiments, the reward levels may be assigned randomly to the users with correct responses.

In still other embodiments, the reward level may be based on a point system where multiple requests for a response are made. Each user may accumulate points based on correct answers submitted and when the answers were submitted. After a designated period, the user with the most points may be assigned a first reward level, and all other users may be assigned reward levels based on a predetermined scheme.

Various embodiments may further comprise a database system to track responses received, when the responses were received, whether the correct response was submitted, the reward level assigned to each response, and details about each responding user.

In various embodiments, the method 100 may further comprise sending a reply to each responding user. The reply may simply acknowledge the receipt of the response, or the reply may specify the reward level assigned to the user. The reply may also comprise an advertisement or additional information concerning the video content, the interactive content, or another product or service. Additionally, the response may include instruction for redeeming or claiming the reward, such as an Internet address for a website, log in information for the website, and an alphanumeric confirmation code to enter after logging into the web site. The reply may be displayed on the user's video display device, or may comprise a text message, an email message, an instant message, a message delivered via a social media network, a telephone call, or the like.

In various embodiments, the assigned reward level may further be communicated to a provider of a product or service when that product or service is included in the reward level. For example, the provider of the product or service may need to know which users were assigned reward levels and what those reward levels are in order to monitor redemption of the rewards and lessen any fraudulent reward redemption.

Figure 2:
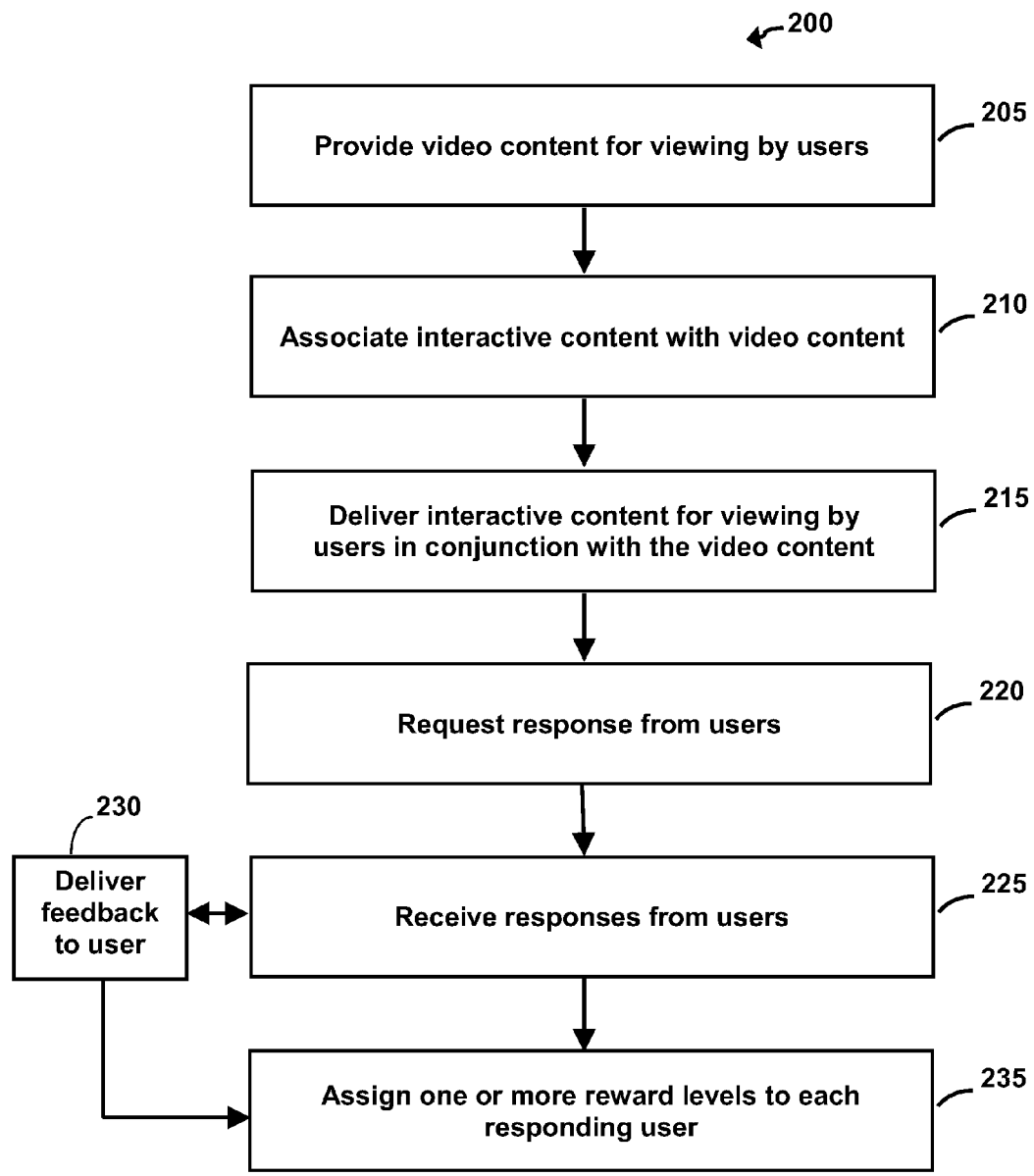
FIG. 2 is an exemplary flow diagram of a method for increasing viewership of video content according to various embodiments.

FIG. 2 is a flow chart of various embodiments of a method 200 for increasing viewership of video content. Steps 205 through 225 generally correspond to steps 105 through 125, respectively of method 100 as described above. After step 225, feedback may be delivered to the responding user based on the response received from the user (step 230). For example, the interactive content may request that the user take a particular action, such as moving a computer mouse cursor to a specified area of the computer screen. The feedback may indicate whether the user carried out the requested action correctly, or perhaps whether the action was carried out within a specified amount of time. The feedback may request further responses from the user, and these responses may be received (step 225) as described previously. In various embodiments, the cycle of delivering feedback to the user (step 230) and receiving further responses from the user may continue until an end point is reached. In other embodiments, one or more reward levels may be assigned to the responding users (step 235) after feedback is delivered to the users.

Figure 3:
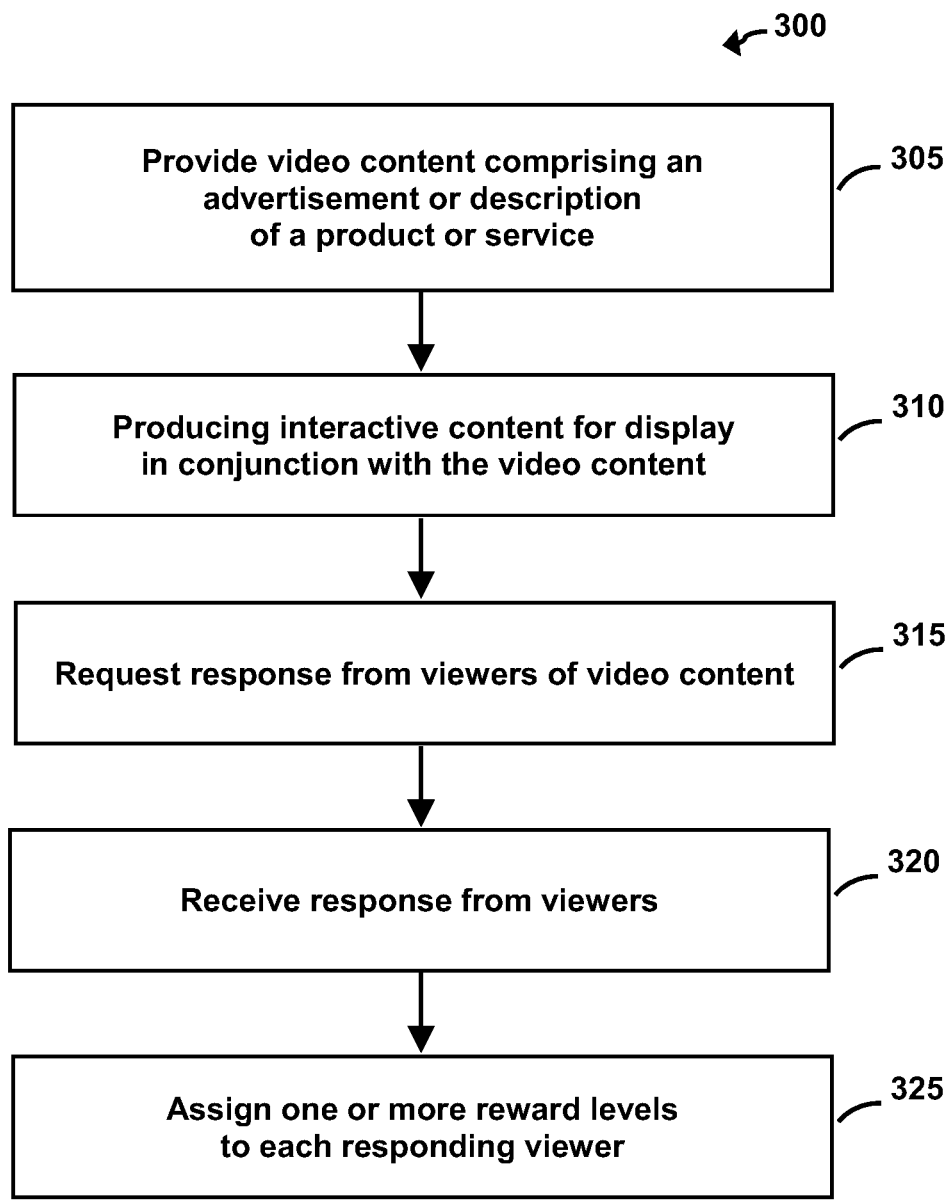
FIG. 3 is an exemplary flow diagram of a method for increasing viewership of video content according to various embodiments.

FIG. 3 is a flow chart of various embodiments of a method 300 for increasing viewership of video content through the production of video content and interactive content. Video content comprising an advertisement or description of a product or service may be produced at step 305. In some embodiments, the video content is a commercial for the product or service. Producing the video content may comprise any portion of the steps required to prepare and create a video commercial. In general, an end result of step 305 may be a video commercial suitable for display to a plurality of users over a variety of delivery methods including over-the-air broadcast using, for example, the National Television System Committee (NTSC) analog format, the Advanced Television Systems Committee (ATSC) digital format, or any other broadcast format known in the art. The video content may also be delivered over a cable TV system or a satellite broadcast system. In addition, video content may be delivered over the Internet, with or without a web browser program. Video content delivered over the Internet may be reproduced using a program for video reproduction, such as Windows Media Player® (registered mark of Microsoft Corporation), Adobe® Flash® Player (registered marks of Adobe Systems Incorporated), QuickTime™ (registered mark of Apple Incorporated), and the like. Examples of video content delivered over the Internet may comprise YouTube® (registered mark of Google, Incorporated) videos, music videos, and replays of broadcast video content provided by broadcast companies such as CBS, NBC, ABC, Fox, and the like, and video content or still images displayed on social media websites such as Facebook® (registered mark of Facebook, Incorporated), LinkedIn® (registered mark of LinkedIn Corporation), Myspace® (registered mark of Myspace, Incorporated), and the like. In various embodiments, the video content may be delivered over a cellular telephone network to the user's smartphone.

At step 310, interactive content is produced for display in conjunction with the video content. The interactive content may comprise any video and/or audio content that requests a response or feedback from the user. The interactive content may be in a video format similar to that described above for the video content, text that appears on a portion of a video display device, animation, a still image, a 2-D or 3-D barcode, or any other visual representation that may be displayable on a video display device. The interactive content may also comprise imbedded information, such as links to websites, meta-information, and machine executable instructions. Additionally, the interactive content may comprise only an audio component. The interactive content may also comprise any combination of the above video and/or audio content, or other content as known in the art. As described above for method 100, displaying the interactive content in conjunction with the video content may refer to being temporally related to when the user views the video content.

Steps 315 through 325 generally correspond to steps 120 through 130 respectively of method 100 as described above.

Figure 4:
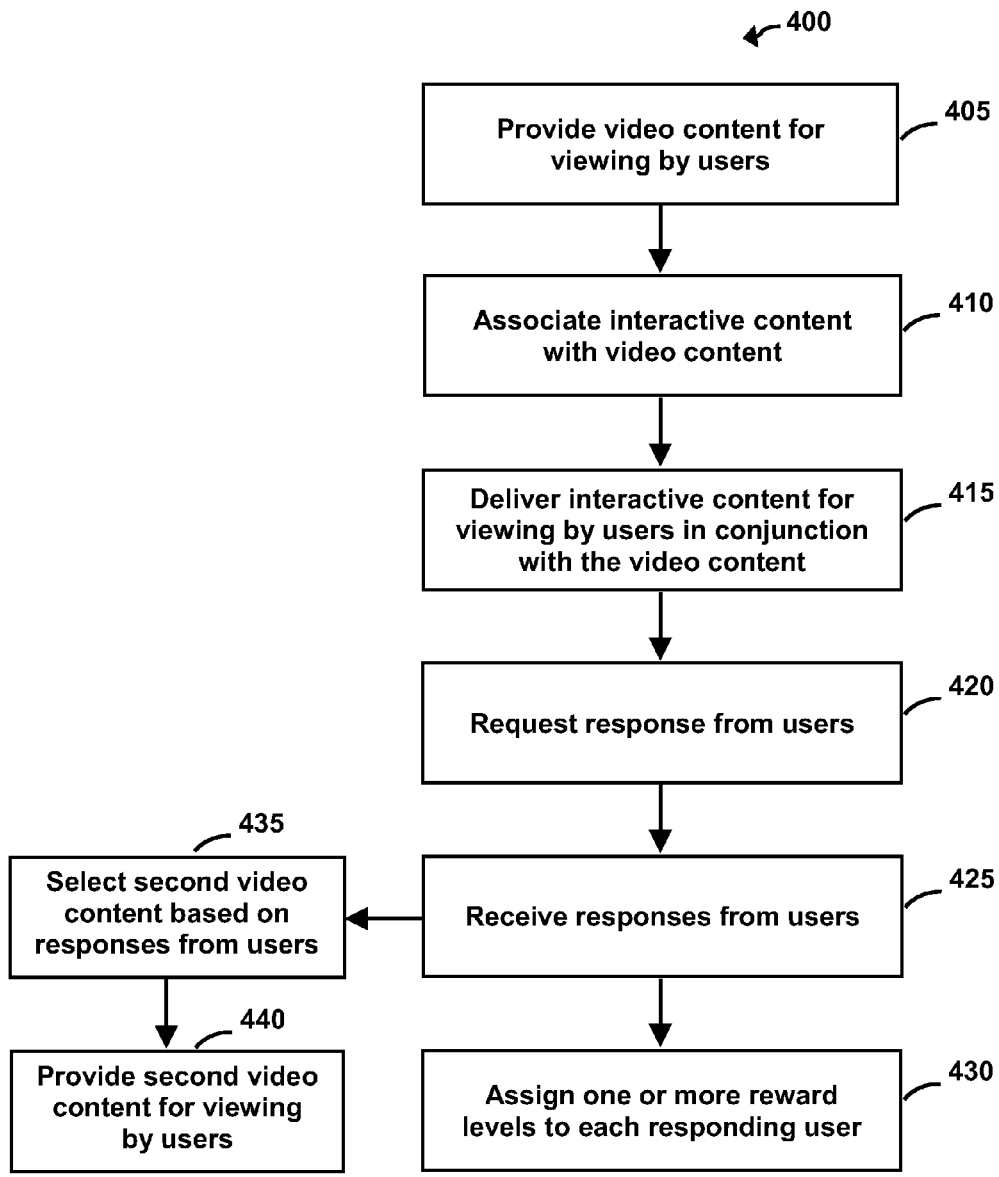
FIG. 4 is an exemplary flow diagram of a method for increasing viewership of video content according to various embodiments.

Various embodiments may require the users to register on a website and provide some amount of personal and/or biographical information prior to submitting a response in reply to the interactive content. This information along with information related to the subject matter of the video content and the product or service that is the subject of the interactive content may comprise marketing information that may be utilized to develop improved or enhanced marketing. The various embodiments of FIG. 4 illustrate how this information may be used to enhance marketing efforts. Steps 405 through 430 of method 400 generally correspond to steps 105 through 130 of method 100 as described above. At step 425 after the responses have been received from the users, the responses may be analyzed to determine, for example, whether a particular product or service is more often indicated in the responses. Using the results of this analysis, a second video content may be selected (step 435), then the second video content may be provided to the users (step 440).

An example of method 400 may comprise a live TV broadcast of a golf match as the video content. While a predetermined golfer is playing a shot, interactive content in the form of a banner may be displayed on the television screen. The interactive content asks the users to log into a website and provide the answer to a trivia question, such as which brand of golf club irons the golfer was using when he won his first major tournament. Once the responses are received, the answers may be tallied and a second video content comprising a commercial for the brand of irons receiving the most responses is selected and played during the live TV broadcast, along with the answer to the trivia question.

Other examples of method 400 may comprise interactive content that asks the users to respond with their favorite product or service that may be related by subject matter to the video content. For example, the video content may be a commercial for a food product manufactured by a large corporation that is broadcast during a TV show. The interactive content may ask the users to respond with their favorite soup made by the same manufacturer. Once the responses are tallied, the second video content may be a commercial broadcast later in the TV show for the soup that had the most responses.

Other embodiments may utilize marketing data in a variety of ways. For example, personal and biographic data may be used to determine a profile of the users who respond to a certain interactive content. Where the video content or the interactive content focuses on a particular product or service, demographic information on the responding users may be used to determine a profile of users most interested in the product or service that may comprise age, sex, marital status, employment, income, number of children, geographic location, and the like. Advertisers may then use this information to enhance marketing efforts.

The reward levels of various embodiments may comprise different percent discounts on the purchase of a product or service. Purchase information may be obtained comprising which users redeemed their discounts and purchased the product or service and which users did not. The demographic information for the portion of the users who redeemed their discounts and the portion of users who did not redeem their discounts may be used to determine specific demographic groups that have higher interest in the product or service. Analysis of which discounts were redeemed may also be used to determine the level of discount required to affect the purchasing decision of various demographic groups. For example, a 10 percent discount may not have a significant effect on purchasing decisions for any demographic group, while a 40 percent discount may be required to affect the purchasing decisions of, say, single males under the age of 30. Many other marketing analyses as are known in the art may also be performed using information obtained through various embodiments of the present disclosure.

Figure 5:
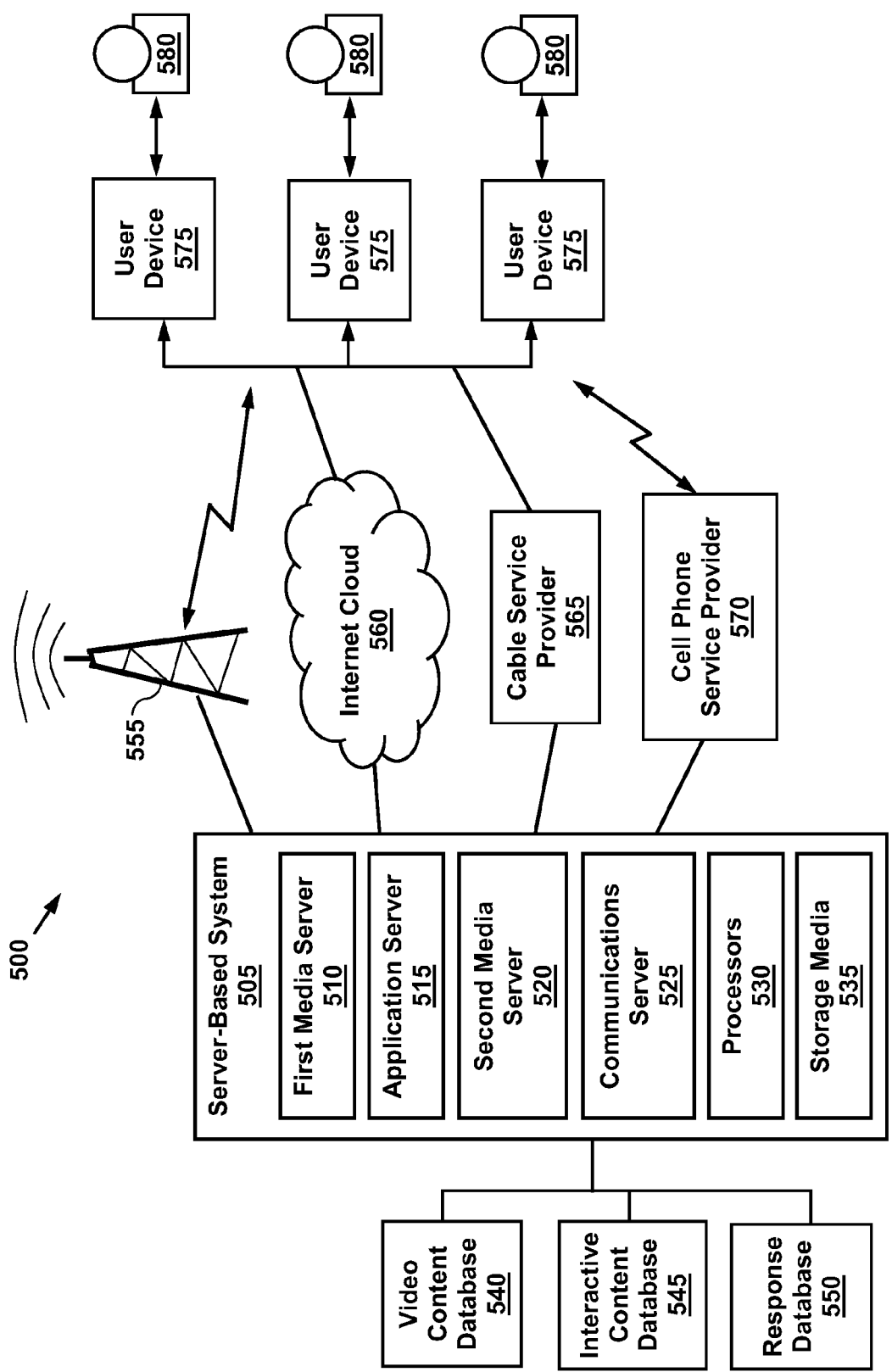
FIG. 5 is a schematic diagram of an exemplary architecture of a system for increasing viewership of video content according to various embodiments.

FIG. 5 is a schematic diagram of an exemplary system 500 for increasing viewership of video content. The system 500 may comprise a server-based system 505 comprising a first media server 510 configured to provide video content to a plurality of users 580. The first media server 510 may be operative to deliver the video content over a variety of delivery methods including over-the-air broadcast 555, a cable service system 565, over the Internet Cloud 560 with or without a web browser program, or over a cellular telephone network 570 as described previously for method 100.

The video content may be any form of video, whether a motion picture or still images, delivered to a user for viewing. The video content may comprise a TV program intended for over-the-air broadcast, cable broadcast, or Internet-based delivery to a user, among other delivery methods known in the art. The video content may also comprise a sporting event, news program, educational program, political event, on-demand content, video game, or any other entertainment or informational content. The video content may comprise a single program or event, such as a specific football game, or may comprise a multi-part series, such as a season of episodes of a TV program. The video content may be in a high-definition or low-definition format, and may contain audio content in addition to the video content.

The server-based system 505 may further comprise an application server 515 configured to associate interactive content with the video content. As described previously for method 100, associating the interactive content with the video content may comprise any method of linking specific interactive content with specific video content based on some commonality between the two. In various embodiments, the linking may be based on the subject matter of the video content. In other embodiments, there may be no subject matter commonality between the interactive content and the video content, and the link between the two may be based on other factors such as general interest of a broad audience.

The interactive content may comprise any video and/or audio content that requests a response or feedback from the plurality of users 580. The interactive content may be in a video format similar to that described above for the video content, text that appears on a portion of a video display device, animation, a still image, a 2-D or 3-D barcode, or any other visual representation that may be displayable on a video display device. The interactive content may also comprise imbedded information, such as links to websites, meta-information, and machine executable instructions. Additionally, the interactive content may comprise only an audio component. The interactive content may also comprise any combination of the above video and/or audio content, or other content as known in the art.

A second media server 520 may be configured to provide the interactive content to the plurality of users 580. In various embodiments, the second media server 520 may be the same server, or part of the same server, as the first media server 510. The second media server 520 may operate as described above for the first media server 510.

The server-based system 505 may additionally comprise a communications server 525 configured to receive responses from at least a portion of the plurality of users 580 in response to the interactive content. The communications server 525 may be operative to convert the video signal to any appropriate format for the chosen method of delivery (TV broadcast, cable, broadcast, satellite broadcast, Internet, cell phone, and the like) to the plurality of users 580.

One or more processors 530 may compile the responses from the users 580, assign one or more reward levels to each responding user 580, and to gather marketing data on each responding user. In addition, storage media 535 may store the video content, interactive content, user data, responses, assigned reward levels, marketing data, and the like.

The system 500 may also comprise user devices 575 to receive and/or display the video content and interactive content. Depending on the delivery method of the video content and interactive content, the user device 575 may comprise any device with a video display capable of displaying the video content and interactive content. The user device 575 may comprise a television, a computer and/or a computer display terminal, a cellular telephone, and the like. In various embodiments, one user device 575 may display the video content and another user device 575 may display the interactive content. For example, the video content may be displayed on a television. The video content may direct the user 580 to log into a website to access the interactive content, and the user 580 would then view the interactive content on a computer display terminal.

The system 500 may also comprise a plurality of databases to retrievably store a variety of digital information. Exemplary databases include a video content database 540, an interactive content database 545, and a response database 550. The response database 550 may comprise user data, responses, assigned reward levels, marketing data, and the like. The databases may be stored on the storage media 535 of the server-based system 505, may be stored in a cloud environment, or may be stored on storage media outside of the server-based system 505.

Various embodiments may also comprise non-transitory computer readable storage medium having embodied thereon a program executable by a processor for performing a method for increasing the viewership of video content. The program may perform any of the methods described above and their equivalents. In various embodiments, the method may comprise providing a first video content for viewing by a plurality of users, providing a second video content for viewing during or following the first video content wherein the second video content requests a response from the plurality of users, receiving responses submitted from at least a portion of the plurality of users in response to the second video content, ranking the responses based on whether the response is a desired response, and an elapsed time for submitting the response, and assigning one or more reward levels to each response based on the ranking.

According to some embodiments, the system 500 may include a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource may be utilized exclusively by their owners, such as Google™ or Yahoo!™, or such systems may be accessible to outside users who deploy applications within the computing infrastructure to obtain the benefits of large computational or storage resources.

The cloud may be formed, for example, by a network of web servers with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend upon the type of business associated with each user.

Figure 6:
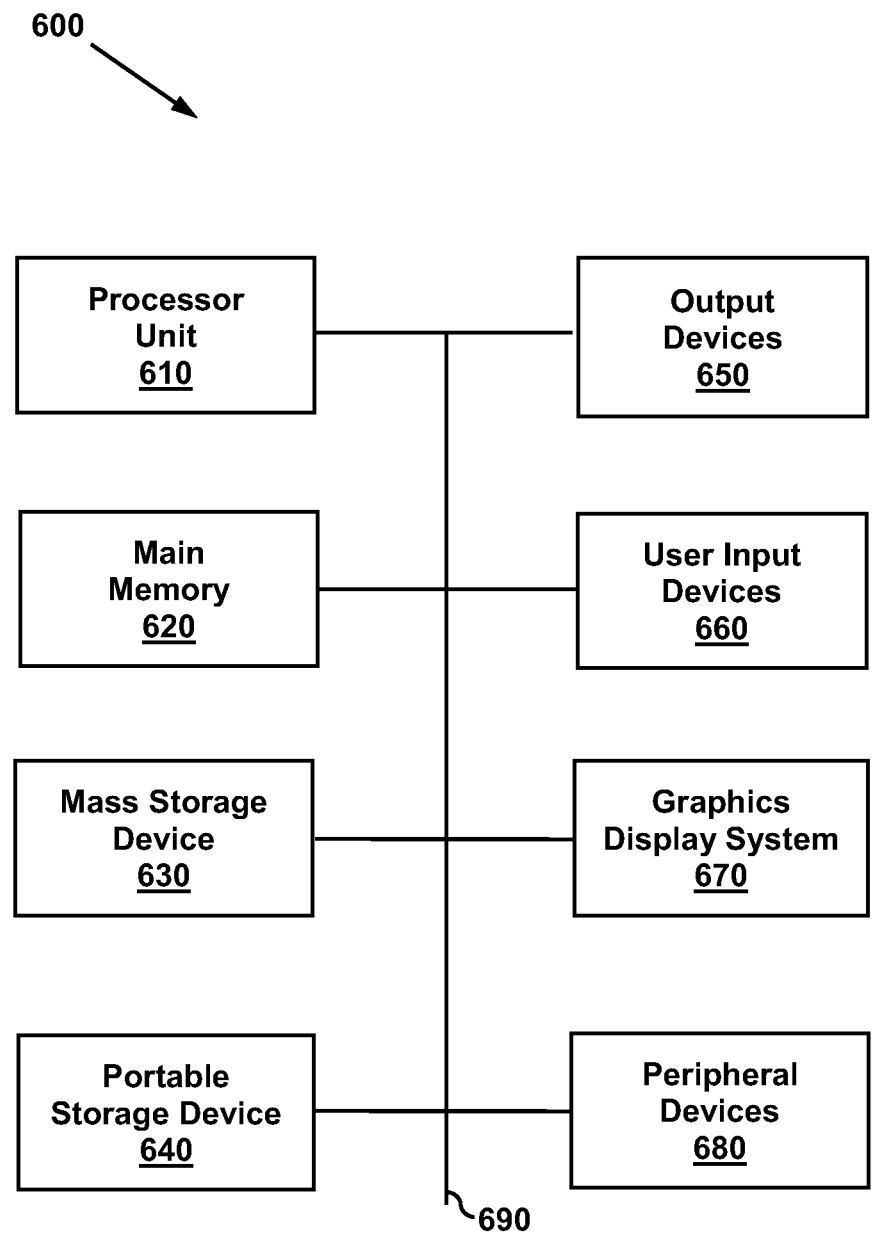
FIG. 6 is a block diagram of an exemplary computing system that may be utilized to practice aspects of the present disclosure according to various embodiments.

FIG. 6 illustrates an exemplary computing system 600 that may be used to implement an embodiment of the present technology. The computing system 600 of FIG. 6 includes one or more processor units 610 and main memory 620. Main memory 620 stores, in part, instructions and data for execution by processor unit 610. Main memory 620 can store the executable code when the system 600 is in operation. The system 600 of FIG. 6 may further include a mass storage device 630, portable storage device(s) 640, output devices 650, user input devices 660, a graphics display system 670, and other peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device(s) 640, and graphics display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present technology for purposes of loading that software into main memory 620.

Portable storage device 640 operates in conjunction with a portable non-volatile storage media, such as a floppy disk, compact disk or digital video disc, to input and output data and code to and from the computer system 600 of FIG. 6. The system software for implementing embodiments of the present technology may be stored on such a portable media and input to the computer system 600 via the portable storage device 640.

User input devices 660 provide a portion of a user interface. User input devices 660 may include an alphanumeric keypad, such as a keyboard, for inputting alphanumeric and other information, or a pointing device, such as a mouse, a trackball, stylus, or cursor direction keys. Additionally, the system 600 as shown in FIG. 6 includes output devices 650. Suitable output devices include speakers, printers, network interfaces, and monitors.

Graphics display system 670 may include a liquid crystal display (LCD) or other suitable display device. Graphics display system 670 receives textual and graphical information, and processes the information for output to the display device.

Peripheral devices 680 may include any type of computer support device to add additional functionality to the computer system. Peripheral device(s) 680 may include a modem or a router.

The components contained in the computer system 600 of FIG. 6 are those typically found in computer systems that may be suitable for use with embodiments of the present technology and are intended to represent a broad category of such computer components that are well known in the art. Thus, the computer system 600 of FIG. 6 can be a personal computer, hand held computing system, telephone, mobile computing system, workstation, server, minicomputer, mainframe computer, or any other computing system. The computer may also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media. In various embodiments, the instructions may be implemented on the server-based system 505. Various embodiments may also comprise instructions stored on a computer or server remote from the server-based system 505, accessible through a local area network, wide area network, wired or wireless connection, or other connection method known in the art.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In order to more fully appreciate the scope and application of the present disclosure, the following non-limiting examples are provided. In the first example, the video content may comprise a TV show popular with a certain demographic group. During the TV show, the interactive content may comprise a commercial for a product known to be popular with the demographic group. During the commercial, a trivia question may be displayed along with instructions for texting an answer to the trivia question to a predetermined number. The first person to text the correct answer may receive the product for free, while the rest of the correct respondents may receive discounts on the purchase of the product that range from 10 percent to 80 percent depending on how fast they responded. The correct respondents may also receive a reply text with a URL address for a website and how the respondents may log into the website and redeem their discount. In various embodiments, a random winner may be chosen among all the correct entries rather than declaring the fastest respondent the winner. This may be perceived as more equitable for many users, prompting a higher response rate.

A second example may involve a series of TV shows. Similar to the first example above, a trivia question may be displayed as part of a commercial broadcast during the TV show. Rather than receiving a discount on the product, the correct respondents receive points based on how quickly they provided the correct response to the trivia question. This process is repeated at least once during each episode of the TV series for one season of the series. At the end of the series, the user with the highest point total wins the contest. A variety of reward levels may be established based on points obtained during the season.

Another example may involve a video displayed on a website such as YouTube®. Each user who views the video may be asked one of several questions about an observable detail in the video, such as the brand of shoes worn by someone in the video. The users may be given a URL for a website and directions for logging into the website and providing their answer. After a period of time, one or more winners may be chosen from among the correct respondents. Each of the one or more winners may receive an email comprising instructions for redeeming their prize.

One example may comprise a soft drink commercial as the interactive content. The commercial may include a dance routine by a famous pop star. The interactive content may request users to submit a video of themselves imitating the dance routine. One or more winners may be selected from among the entrants.

Yet another example may comprise a live TV broadcast of a football game. The interactive content may comprise a video game displayed separate from the video content, such as on a website. The game may be a game of skill, such as kicking a football through a goal post. Moving a cursor over various parts of an image of the kicker displayed on the computer screen may cause the kicker to kick the ball a certain distance and in a certain direction. Points may be awarded for how many successful kicks are made in a given amount of time, and one or more winners may be chosen based on points. In this example, the winner may be allowed to participate in a live post-game interview via webcam with the winning team.

In another example, a user may visit a website and select certain video content to be displayed. Prior to displaying the video content, a commercial is displayed on a portion of the computer screen. A still image may be displayed on another portion of the computer screen. A logo for the product or service featured in the commercial may be hidden in the still image. If the user can find the hidden logo and place the mouse cursor over the image before the commercial ends, then the user may win a prize.

In addition to trivia questions, the interactive content may comprise games of chance. Exemplary games of chance may include card games such as poker and blackjack, dice games, roulette, and the like. Games of chance may also include guessing one or more numbers between two given numbers, similar to a lottery. The interactive content may also comprise games of skill, such as completing a math problem within a certain amount of time, completing word or shape puzzles, finding words hidden within a given word, and the like.

Some embodiments may require pre-registration in order to participate. When the video content is delivered over a cable TV system, the cable TV provider may provide a pre-populated entry form comprising the user's information already known to the cable TV provider, such as name, address, phone number, and email address. This information may be displayed by the cable TV provider on the TV, and the user may accept or decline the entry form using the cable TV remote control, or other electronic device capable of communicating with the cable TV set-top box, the TV, or a modem. Similar information and pre-registration capability may be provided by an Internet service provider or a cellular telephone service provider. Other methods of pre-registration and participation may comprise a computer application installed on a smartphone or tablet computer, such as an application written for the Android operating system or the iOS operating system.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for increasing viewership of advertisements comprising:
   providing an advertisement from a server-based system for viewing by a plurality of users;
   associating interactive content with the advertisement;
   delivering the interactive content for viewing by the plurality of users after an end of the advertisement, the interactive content requesting a response from the plurality of users;
   receiving responses submitted from at least a portion of the plurality of users; and
   assigning one or more reward levels to each responding user; wherein at least one reward level comprises allowing at least one responder to begin participating live via a webcam in a live national television or Internet broadcast.

2. The method of claim 1, wherein the one or more reward levels comprise discounts on a purchase of a product or service.

3. The method of claim 2, wherein the discounts range from about 1 percent to about 100 percent.

4. The method of claim 2, further comprising communicating the reward level assigned to one or more of the responding users to a provider of the product or service.

5. The method of claim 1, further comprising associating the interactive content based on a subject matter of the advertisement.

6. The method of claim 1, further comprising:
   providing the advertisement during a presentation of a second video content; and
   associating the interactive content based on a subject matter of the second video content.

7. The method of claim 1, further comprising delivering a reply to each responding user.

8. The method of claim 7, wherein the reply comprises the reward level assigned to the responding user.

9. The method of claim 8, wherein the reply comprises instructions for redeeming a reward.

10. The method of claim 9, wherein the instructions comprise an Internet address for a web site, login information for the web site, and an alphanumeric confirmation code to be entered at the web site.

11. The method of claim 7, wherein the reply comprises a text message, an email message, a message displayed on a video display device, a message sent through a social media website, or a telephone call.

12. The method of claim 1, wherein the interactive content comprises a trivia question.

13. The method of claim 12, further comprising:
ranking the responses based on whether the response is a correct answer to the trivia question and an elapsed time for submitting the response; and
assigning the one or more reward levels based on the result of the ranking.

14. The method of claim 1, wherein the interactive content comprises a game of chance.

15. The method of claim 1, wherein the interactive content comprises a game of skill, wherein the game of skill utilizes manual dexterity of a user in a competitive video game setting.

16. The method of claim 1, wherein the responses received from at least a portion of the plurality of the users comprises a pre-recorded video response received over a network from a user.

17. The method of claim 1, further comprising assigning the one or more reward levels based on an elapsed time for submitting the response.

18. The method of claim 1, further comprising:
receiving a first response from at least a portion of the plurality of users in response to the interactive content delivered during a first episode of a series of video episodes;
assigning a first value to each of the first responses;
receiving a second response from at least a portion of the plurality of users in response to the interactive content delivered during a second episode of the series of video episodes;
assigning a second value to each of second responses;
calculating a cumulative value based on at least the first and second values; and
assigning the one or more reward levels to each responding user based on the cumulative value.

19. The method of claim 1, further comprising:
gathering marketing data comprising one or more of demographic information on the responding users, the reward level assigned to the responding users, and whether the responding users redeemed the reward; and
communicating the marketing data to a provider of the product or service.

20. The method of claim 1, further comprising:
selecting a video content based on an analysis of the responses; and
providing the video content from the server-based system for viewing by the plurality of users.

21. A system for increasing viewership of advertisements, comprising:
a first media server configured to provide an advertisement to a plurality of users;
an application server configured to associate interactive content with the advertisement, the interactive content adapted to request a response from the plurality of users;
a second media server configured to provide the interactive content to the plurality of users during the advertisement;
a communications server configured to receive responses from at least a portion of the plurality of users in response to the interactive content, the responses comprising a pre-recorded image transmitted over a network to the communications server;
one or more processors configured to: assign one or more reward levels to each responding user, at least one of the reward levels corresponding to a discount on a purchase of a product or service; and wherein at least one reward level comprises allowing at least one user to begin participating live via a webcam in a live national television or Internet broadcast; gather marketing data on each responding user comprising demographics, assigned reward level, and redemption status of an assigned reward; and
one or more storage media to store the advertisement, interactive content, and marketing data.

22. The system of claim 21, wherein the communications server is further configured to:
deliver a reply to each responsive user, the reply comprising the assigned reward level; and
deliver at least a portion of the marketing data to a supplier of the product or service.

23. The system of claim 21, wherein the application server is further configured to associate interactive content with video content based on a subject matter of the video content.

24. The system of claim 23, wherein a subject matter of the interactive content is essentially the same as a subject matter of the video content.

25. The system of claim 23, wherein the application server associates a trivia question as the interactive content, the trivia question having essentially the same subject matter as the video content.

26. A non-transitory computer readable storage medium having embodied thereon a program, the program being executed by a processor to perform a method for increasing a viewership of advertisements, the method comprising:
pre-registering a plurality of users for eligibility to submit responses in response to video content;
providing an advertisement for viewing by the plurality of users;
providing the video content for viewing after an end of the advertisement, the video content requesting a response from the pre-registered plurality of users;
receiving responses submitted from at least a portion of the pre-registered plurality of users in response to the video content, the responses comprising a pre-recorded image transmitted over a network to the communications server;
ranking the responses based on whether the response is a desired response and an elapsed time for submitting the response; and
assigning one or more reward levels to each response based on the ranking; and wherein at least one reward level comprises allowing at least one user to begin participating live via a webcam in a live national television or Internet broadcast.

27. The non-transitory computer readable storage medium of claim 26, wherein the reward level comprises a free product or service, or a discount on the purchase of a product or service.

28. The non-transitory computer readable storage medium of claim 26, further comprising sending a reply to the responding users comprising the reward level assigned to the response and instructions for redeeming the reward.

29. The non-transitory computer readable storage medium of claim 26, further comprising:
associating the response to the video content with an Internet service provider account information for the responding user; and
pre-populating a reward redemption form with at least a portion of the account information.

30. A method for increasing viewership of advertisements comprising:
producing video content comprising an advertisement;

producing interactive content for display after an end of the video content, the interactive content comprising a request for a response from a plurality of viewers of the video content;

receiving responses and assigning one or more reward levels to each responding viewer, wherein the responses received from at least a portion of the plurality of viewers comprises a pre-recorded video response received over a network;

sending a reply to the at least a portion of the plurality of viewers, the reply indicating the one or more reward levels assigned to the responding viewer;

wherein the reply comprises an email message, a message sent through a social media website, or a telephone call; and wherein at least one of the reward levels comprises allowing at least one viewer to begin participating live via a webcam in a live national television or Internet broadcast.

31. The method of claim 30, wherein the interactive content is a trivia question, and the response is an answer to the trivia question.

32. The method of claim 30, further comprising gathering marketing data on each responding viewer, and reporting at least a portion of the marketing data to a supplier of the product or service.

33. The method of claim 30, further comprising broadcasting the video content during or following a television broadcast program.

34. The method of claim 33, wherein a subject matter of the interactive content relates to a subject matter of the television broadcast program.

35. The method of claim 30, further comprising broadcasting the video content during or following a live Internet broadcast.

* * * * *